Dec. 12, 1944.   H. W. MATTINGLY   2,364,865
SHOCK ABSORBING STRUT
Filed Oct. 7, 1941   2 Sheets-Sheet 1

INVENTOR
Harold W. Mattingly

Dec. 12, 1944.     H. W. MATTINGLY     2,364,865
SHOCK ABSORBING STRUT
Filed Oct. 7, 1941     2 Sheets-Sheet 2

INVENTOR
Harold W. Mattingly

Patented Dec. 12, 1944

2,364,865

UNITED STATES PATENT OFFICE 2,364,865

SHOCK ABSORBING STRUT

Harold W. Mattingly, Los Angeles, Calif., assignor to Axelson Manufacturing Co., Los Angeles, Calif., a corporation of California Application October 7, 1941, Serial No. 413,967

5 Claims. (Cl. 267—64)

My invention relates broadly to improvements in shock absorbers and has particular reference to shock absorbing struts for use with the landing gear of aircraft.

Shock struts for use in connection with airplane landing gears are usually of the combination hydraulic and pneumatic type wherein a pair of telescopically assembled cylinders are held in their extended position by means of air pressure maintained within the cylinders and the shocks of landing the airplane are absorbed by the transfer of liquid from one of the cylinders to the other through restricted openings or orifices. In order to permit the relatively free contracting motion of the cylinders relative to each other but to snub or check the extending movement of the cylinders, the cylinders are so assembled relative to each other that during the contracting movement an auxiliary chamber is provided of gradually increasing volume as the cylinders telescopically move toward each other while upon the extending movement of the cylinders this chamber is gradually reduced in volume.

Thus by permitting a small amount of the liquid to flow from the cylinders into this chamber during the contracting motion in a relatively free manner, and then to permit the return of this liquid from the chamber to the cylinders by a restricted path or retarded motion, the snubbing or checking effect is accomplished.

It is an object of my invention to improve upon the construction of shock absorbers of the character just described by providing a relatively inexpensive mechanism by which the rate of flow from the cylinders to the auxiliary chamber may be controlled and whereby the return flow from the chamber to the cylinders may be readily restricted to provide any desired or predetermined rate of motion of the cylinders during the expanding stroke.

Another object of my invention is to provide a positive and accurate means for adjusting the rate of flow of the liquid between the chamber and the cylinders which may be accomplished at any time during the life of the shock struts.

Another object of my invention is to provide an improved and simplified construction of a metering orifice plate which may be employed to meter the passage of fluid between the two cylinders.

Other objects and advantages of my invention will be apparent from the study of the following specifications, read in connection with the accompanying drawings, wherein Fig. 1 is a vertical elevational view of a shock strut constructed in accordance with my invention with portions of the mechanism broken away and shown in section, the strut being shown in a substantially completely contracted position;

Figure 1:
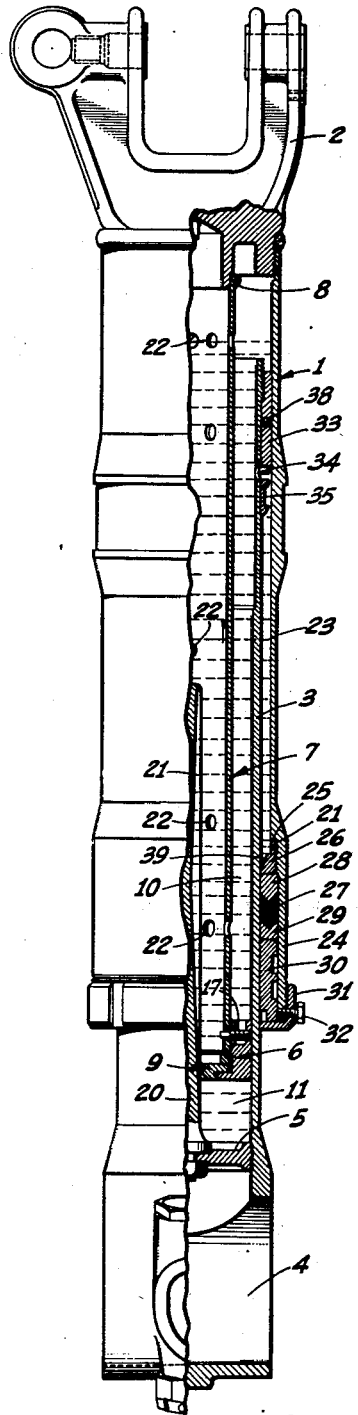

Referring to the drawings, I have illustrated in Fig. 1 a shock strut of a type adapted for use on aircraft landing gear which comprises an outer cylinder member 1, to the upper end of which is fixed a suitable bracket 2 by which the upper end of the strut may be secured to the wings or frame of the aircraft. Telescopically assembled within the outer cylinder 1 is an inner cylinder 3, the lower end of which is formed with or has secured thereon a bracket 4 by which the inner cylinder may be coupled to the landing gear of the aircraft.

The inner cylinder 3 is provided adjacent its lower end with a partition or closure 5 constituting a complete closure or cylinder head for the lower end of the inner cylinder 3. A piston 6 is disposed within the inner cylinder 3 and is adapted to be rigidly disposed relative to the outer cylinder 1 and movable therewith as by mounting the piston 6 upon the lower end of a piston supporting tube 7 which is in turn rigidly secured to the bracket 2 as indicated at 8.

The lower end of the bracket 2 is preferably formed as a cylindrical member which may be inserted into the upper end of the outer cylinder 1 and there constitute a closure or cylinder head for the outer cylinder 1.

Thus by partially filling the assembled cylinders with oil or some non-compressible liquid and supplying air or other compressible gas to the interior of the structure to build up a predetermined pressure therein, the air acts as a spring to urge the cylinders toward their fully extended position while the liquid, being required to be transferred from one of the cylinders to the other as the cylinders move telescopically, is employed to regulate the rate of such telescopic movement and retard or absorb the shocks.

To regulate the transfer of the fluid from one of the cylinders to the other, the piston 6 is provided with a fixed diameter opening 19 therethrough intercommunicating the lower portion 11 of the cylinder 3 with the upper portion 10 of this cylinder, the fixed sized opening being preferably formed in an orifice plate 9 adapted to be secured in the piston 6.

Figure 5:
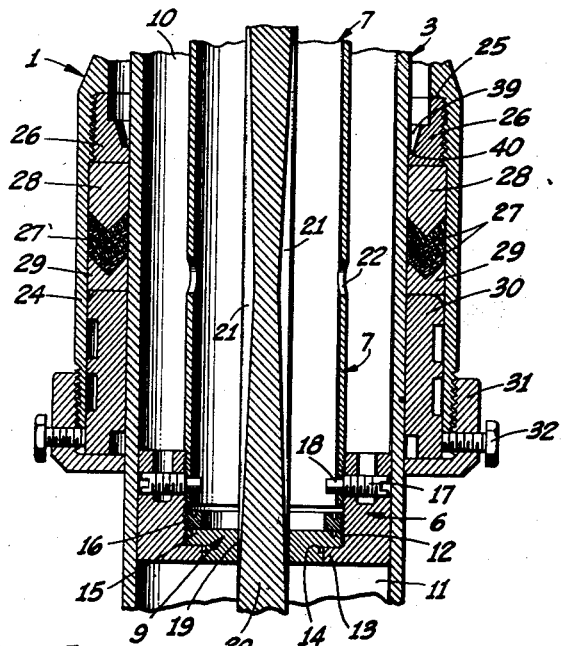
Fig. 5 is a detail fragmentary vertical sectional view of a portion of the strut illustrating the construction and location of the metering orifice plate and the guiding and packing structure employed between the two cylinders.

As is illustrated particularly in Fig. 5, the piston 6 is constructed as a ring-like member, the interior of which is threaded as indicated at 12 while at the extreme lower end of the ring-like piston 6 there is provided an inwardly extending flange 13. The orifice plate 9 is formed as a substantially disc-like member, the outer edge of which is threaded to be received in the threaded bore 12 of the piston 6 and the lower surface of the plate 9 is preferably under-cut to form a shoulder member 14 adapted to rest upon the upper surface of the flange 13 of the piston 6 when the orifice plate is assembled within the piston 6.

While I have illustrated the orifice plate 9 as having its outer edge threaded, by which it may be screwed into the threaded bore 12 with the use of any suitable spanner wrench or pin wrench engaging in wrench bores 15, it will be apparent that the orifice plate 9 may be merely dropped into the piston 6 and be clamped in place therein by means of a suitable lock washer or nut 16 threaded into the bore 12 by a similar spanner or pin type of wrench.

The upper end of the threaded bore 12 of the piston 6 may be utilized as the means for coupling the piston to the piston supporting tube 7 as by threading the lower end of the tube 7 into the piston 6 and locking the same in place by means of suitable locking screws 17 projected radially through the piston 6 and into and through suitable lock bores or holes 18 formed in the lower end of the piston tube 7.

By utilizing the construction just described, it will be apparent that the piston and its orifice plate may be assembled as one operation and then the assembled structure may be secured to the piston support tube 7 as a second or subsequent operation by which any irregularities or imperfections in the length of the support tube 7 may be compensated for by regulating the extent to which the piston support tube is projected into the piston 6. Further, by employing the threaded connection between the orifice plate and the piston 6 and the lock washer 16, the orifice plate is rigidly and permanently locked against accidental displacement during service of the shock strut.

The orifice plate 9 may be employed without a metering pin by so selecting the diameter of the central bore or orifice 19 through the plate as to permit the desired transfer of fluid from the lower portion 9 of the cylinder 3 to the upper portion of this cylinder under the loads for which the strut is designed, or the orifice plate may be used with a metering pin 20 by which the rate of flow of fluid through the orifice may be regulated and varied during different portions of the stroke of the strut. For this purpose I have illustrated a metering pin 20 mounted upon and rigid with the partition or end closure 5 for the cylinder 3 and projecting upwardly therefrom to enter and restrict the orifice 19 when the cylinders 1 and 3 are moved toward their telescoped or contracted positions, the metering pin 20 being provided either with an external shape varying its effective diameter at different portions of its length or it may be provided with one or more grooves 21 of variable depth at different portions along the length of the pin 20 to achieve the same result of variably restricting the passage of fluid through the orifice 19 during different portions of the stroke.

By employing a tubular member as the support for the piston 6, it is necessary to provide for free passage of fluid between the interior and exterior of this tube and for this purpose a plurality of holes 22 may be provided through the walls of the tube 7 so that as the fluid is transferred from the lower portion of the cylinder 3 through the metering orifice 19, it may have free access to the interior of the cylinder 3.

The design of the metering orifice and the metering pin, if one is used, is selected to absorb or resist the contracting movement of the strut under the loads for which it is designed but it is desirable that the rate of the recoil or expansion of the strut after the shock has been applied and released should be less than the rate of movement during the contracting stroke. To provide for this difference in rate, a chamber 23 is provided between the inner cylinder 3 and the outer cylinder 1 as by forming the inner cylinder 3 with a diameter somewhat smaller than the internal diameter of the cylinder 1 and providing spacers or bearings between the cylinders 1 and 2 to close both ends of the chamber 23.

As illustrated, the lower end of the outer cylinder 1 is provided with an enlarged diameter portion 24 forming at its junction with the smaller diameter of the cylinder 1 an internal shoulder 25 against which may be screwed a packing support washer 26 constituting a bearing member against which a packing ring assembly may bear, the packing ring assembly preferably being constructed as annular chevron packing 27 disposed between supporting metal packing rings 28 and 29.

To hold the packing assembly in place and to provide for the necessary adjustment of the pressure exerted on the packing, a bearing sleeve 30 may be inserted into the lower end of the cylinder 1 to fill the space between the enlarged portion 24 and the adjacent external surface of the cylinder 3, the length of the bearing member 30 being such that its lower edge will project slightly beyond the lower end of the cylinder 1 whereby a cap or nut 31 threaded onto the end of the cylinder 1 may be tightened or loosened to press the bearing sleeve 30 against a packing assembly with any desired force, the nut 31 being preferably locked in its position by means of a set screw 32.

The upper end of the chamber 23 is closed off by means of a bearing sleeve 33 threaded or otherwise adjustably mounted upon and moving with the upper end of the inner cylinder 3 and extending across the annular space between the inner and outer cylinders.

Figure 2:
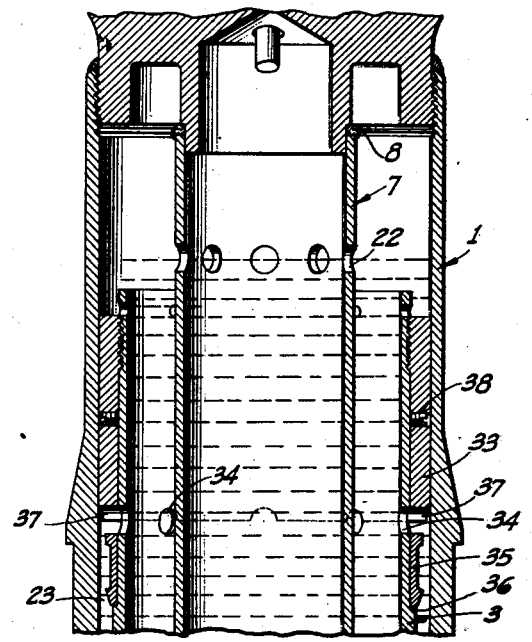
Fig. 2 is an enlarged fragmentary vertical sectional view illustrating the metering ports and valve structure employed to control the transfer of fluid between the cylinders and the auxiliary chamber with the parts in the positions they will assume during the contracting stroke of the strut.

Communication between the chamber 23 and the interior of the cylinders 1 and 3 is provided by means of one or more ports or passages 34 extending transversely through the walls of the inner cylinder 3 immediately below the bearing member 33, such ports, if a number of them are provided, being disposed in the same transverse plane and preferably regularly spaced about the circumference of the inner cylinder 3 as indicated particularly in Figs. 2 and 3. The size of each of the ports and the number of them is preferably selected that their combined areas will provide for a relatively free and unrestricted transfer of fluid to and from the chamber 23. Thus on the contracting stroke of the strut the chamber 23 will gradually enlarge its volume and the fluid will readily pass from the interior of the cylinders to the chamber 23.

On the expanding stroke of the strut the rate of movement of the cylinders relative to each other may be restricted in any desired amount by providing a valve structure which will partially close each of the passages or ports 34. One such valve structure is illustrated herein as comprising a sleeve member 35 freely slidably mounted upon the exterior of the inner cylinder 3 and having a wall thickness somewhat less than the distance across the annular space between the inner and outer cylinders. Thus when the cylinders are moving during their contracting stroke, the flow of fluid through the ports 34 and downwardly past the valve sleeve 35 will force the valve sleeve 35 downwardly to its lowermost position in abutment with a shoulder 36 formed on the cylinder 3 and with the upper edge of the valve sleeve 35 entirely free of the openings or ports 34, permitting the full area of each of the ports to be effective during that stroke.

Figure 3:
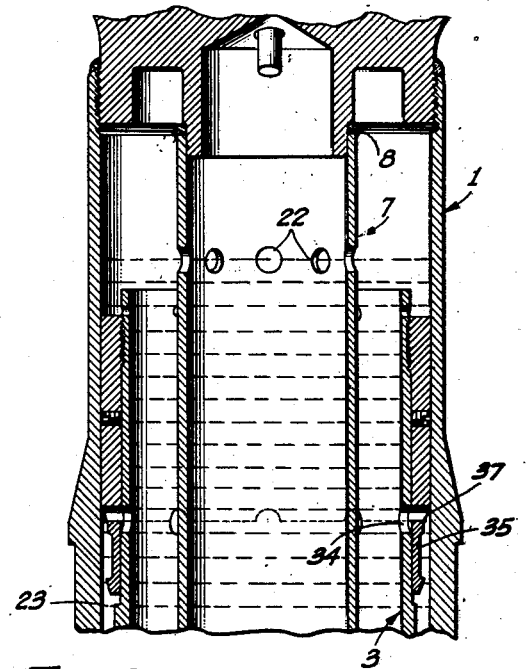
Fig. 3 is a vertical sectional view similar to Fig. 2 and illustrating the positions of the parts during the expanding stroke of the strut.
Figure 4:
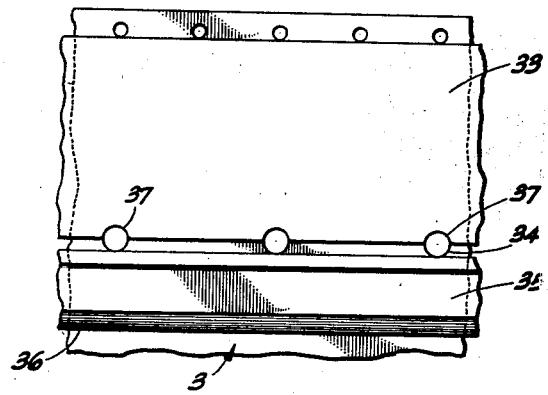
Fig. 4 is a developed view of a portion of the inner cylinder, illustrating the location of the orifices and valve ports.

During the expanding stroke, as illustrated in Fig. 3, the flow of fluid from the chamber 23 back through the orifices or ports 34 and upwardly past the valve sleeve 35 will cause this sleeve to be moved upwardly and across the ports or orifices 34, closing off these ports. In this position of the valve sleeve 35, its upper edge is in abutment with the lower edge of the guide bearing 33 and I utilize this abutment to regulate or control the extent to which the valve will close off each of the ports 34 by forming the lower edge of the bearing sleeve 33 with arcuate notch recesses 37 so disposed as to be alignable with the orifices 34 and permit free passage of fluid through the orifices while a portion of the material of the guide bearing 33 projects downwardly between each pair of adjacent ports. Thus when the valve sleeve 35 has but partially covered the ports 34, it will be brought to a stop and the effective area of the ports for the return of the fluid is restricted to any predetermined amount.

By employing the valve and bearing structure just described, but a single set of transfer orifices 34 is required and by forming the recesses 37 of slightly larger radius than the radius of the orifices 34, a ready adjustment of the rate of return flow from the chamber 23 may be provided merely by screwing the bearing member 33 down or up relative to the cylinder 3 so as to dispose the lower edge of the bearing 33 as a limit stop for the valve sleeve 35 at different positions in its upward movement from a maximum opening to substantially fully closed.

Also the effective area of the transfer ports 34 during the expanding stroke may be adjusted by rotating the bearing member 33 relative to the ports 34 until they close off or obscure portions of the ports. The bearing member 33 may then be locked in any adjusted position by means of suitable set screws 38.

By referring to Fig. 1 it will be observed that at the fully extended positions of the cylinders 1 and 3 the packing support washer 26 will engage the valve sleeve 35 and will act to positively move this valve to its orifice obscuring position, the washer 26 being counter-bored, as indicated at 39, to provide a shoulder 40 adapted to engage the lower edge of the valve sleeve 35.

It will be observed therefore that I have provided a shock strut construction wherein the manufacture of the strut is considerably facilitated by permitting the pre-assembly of parts at one stage of the manufacturing operations prior to the completed final assembly and wherein a maximum of adjustment may be made either during assembly or in the field for the regulation of the rates of either the expansion stroke or the contracting stroke of the strut.

While I have shown and described the preferred embodiment of my invention, I do not desire to be limited to any of the details shown or described therein, except as defined in the appended claims.

I claim:

1. In a shock strut, a pair of telescoping cylinders annularly spaced from each other to define a chamber therebetween, a port extending through one of said cylinders and communicating with said chamber, a valve sleeve slidably mounted on said one cylinder for sliding movement between one position free of said port and another position covering said port, a fixed sleeve on said cylinder having one of its edges disposed toward the valve sleeve to comprise an abutment against which said valve sleeve may strike when in its port covering position, and a notch in said edge of said sleeve adapted to expose said port when said fixed sleeve is disposed with said edge in a plane intersecting the effective area of the port whereby said valve sleeve will engage the projecting edge of the fixed sleeve when the port is but partially covered by said valve sleeve to limit the extent of the partial closing off of said port by said valve sleeve.

2. In a shock strut, a pair of telescoping cylinders annularly spaced from each other to define a chamber therebetween, a port extending through one of said cylinders and communicating with said chamber, a sleeve fixed on said cylinder and having a recess in one edge thereof disposed about said port, a valve sleeve slidably mounted on said cylinder between one position free of said port and another position closing off said port and engageable with the edge of said first sleeve when said port is but partially closed to limit the extent of closing off of said port, and means adjustably mounting said first sleeve on said cylinder for movement to positions obscuring said port to adjustably vary the effective area of said port.

3. In a shock strut, a pair of telescoping cylinders annularly spaced from each other to define a chamber therebetween, a plurality of ports extending through one of said cylinders and communicating with said chamber, all of said ports being disposed in a single plane transverse to the axis of said cylinder, a sleeve valve slidably mounted upon said cylinder for movement across said ports, stop means associated with said cylinder to engage said sleeve valve and limit its movement across said ports when each of said ports has been but partially closed off, and means mounting said stop means on said cylinder for adjustable movement therealong relative to said ports for varying the limit to which said ports will be partially closed by said sleeve valve.

4. In a shock strut, a pair of telescoping cylinders annularly spaced from each other to define a chamber therebetween, a plurality of ports extending through one of said cylinders and communicating with said chamber, the centers of all of said ports being disposed in a single plane transverse to the axis of said cylinder, a sleeve valve slidably mounted upon said cylinder for movement across said ports, and a sleeve surrounding said cylinder and fixed thereto and having a plurality of recesses formed in that end of the sleeve disposed adjacent said ports to provide a plurality of feet disposed between adjacent ports and extending in the direction of the sleeve valve to a position beyond the plane of said ports to engage and limit the movement of the sleeve valve across said ports when each of said ports has been but partially closed off.

5. In combination with a shock strut including a pair of cylinders telescopically assembled one within the other, a piston supported in fixed relation to said outer cylinder by means of a piston tube extending within said inner cylinder and disposing said piston within said inner cylinder, and a metering orifice plate associated with said piston for controlling the rate of transfer of liquid between said cylinders; of a threaded counter-bore extending longitudinally of said piston and terminating in a plate supporting flange at the end of said piston furthermost from the point of connection of said piston to said outer cylinder, lock washer means threaded into said counter-bore to engage and clamp said orifice plate against said flange, and thread means on said piston supporting tube for engaging said threaded counter-bore to adjustably dispose said piston at different distances from the point of connection of said piston to said outer cylinder.

HAROLD W. MATTINGLY.